US005553894A

United States Patent [19]

Klaassen

[11] Patent Number: 5,553,894

[45] Date of Patent: Sep. 10, 1996

[54] CONDUIT CONNECTION TO A CASSETTE FOR PERFORATING SHEETS

[75] Inventor: Gerhard Klaassen, Chavannes, Switzerland

[73] Assignee: Peters Maschinenfabrik, Hamburg, Germany

[21] Appl. No.: 302,055

[22] Filed: Sep. 7, 1994

[30] Foreign Application Priority Data

Sep. 7, 1993 [CH] Switzerland .......................... 02653/93

[51] Int. Cl.$^6$ ...................................................... F16L 55/00

[52] U.S. Cl. ................................ 285/18; 285/24; 285/27; 425/369; 156/472

[58] Field of Search .................................... 156/473, 353, 156/472, 471; 493/470, 471, 463; 425/369, 388, 396; 285/18, 19, 24, 25, 27, 28, 30

[56] References Cited

U.S. PATENT DOCUMENTS

| | | | |
|---|---|---|---|
| 3,125,361 | 3/1964 | Weaver . | |
| 3,353,848 | 11/1967 | Bleasby | 285/19 |
| 4,080,025 | 3/1978 | Garnier et al. | 285/27 |
| 4,177,102 | 12/1979 | Tokuno | 425/369 |
| 4,251,313 | 2/1981 | Abte | 156/472 |
| 4,320,694 | 3/1982 | Carr et al. . | |
| 4,381,212 | 4/1983 | Roberts . | |
| 4,426,104 | 1/1984 | Hazelrigg | 285/27 |
| 4,581,095 | 4/1986 | Schommler | 425/388 |
| 4,787,954 | 11/1988 | Nikkel | 425/369 |
| 4,917,664 | 4/1990 | Lacaux . | |
| 5,188,694 | 2/1993 | Hashida et al. | 156/353 |
| 5,340,432 | 8/1994 | Shulz et al. | 156/472 |

FOREIGN PATENT DOCUMENTS

| | | |
|---|---|---|
| 1551816 | 12/1968 | France . |
| 2622145 | 4/1989 | France . |
| 2823674 | 9/1980 | Germany . |
| 4022769 | 1/1991 | Germany . |

*Primary Examiner*—Eric K. Nicholson
*Attorney, Agent, or Firm*—Hill, Steadman & Simpson

[57] ABSTRACT

A conduit connector is provided so that a heat medium source, a drain and/or a vacuum pressure source are in fluid communication with a cassette containing rotatable cylinders for producing corrugated paperboard. The cassette is insertable in a frame. At least one plug and associated socket are mounted in a first plate and a second plate, respectively. Each plug is secured to an end of a conduit, and the conduit has another end in communication with the cassette. Each socket is in communication with the source. The first plate is fixed relative to the cassette, and the second plate is fixed relative to the source. The plug and the socket are configured to engage each other upon an insertion of the cassette into the frame so that the conduit is in fluid communication with the source.

25 Claims, 2 Drawing Sheets

CONDUIT CONNECTION TO A CASSETTE FOR PERFORATING SHEETS

BACKGROUND OF THE INVENTION

The present invention generally relates to a connection between conduits. More specifically, the present invention relates to a connection for a conduit that carries a heat exchange medium or vacuum into one or more fluted cylinders in an apparatus for producing corrugated paperboard. Furthermore, the present invention specifically relates to a conduit connection in relation to cylinder cassettes configured for frequent changeover.

In known processes for corrugated cardboard or paperboard, a first sheet of paper is corrugated by rolling it between first and second intermeshing fluted cylinders. After the sheet has been corrugated, it is then retained in the flutes of the second cylinder as the cylinder continues to rotate. A gluing cylinder applies glue along the crests of the corrugated sheet as it is held in the flutes. A cover sheet is then applied to the corrugated sheet by pressing the cover sheet to the glued crests of the corrugated sheet by a pressure cylinder, which coacts with the second fluted cylinder.

The above described process is known as "single facing," as it results in a corrugated board having only one flat side. With a subsequent step, "double facing" is achieved by applying another sheet to the single-faced sheet so that both sides of the corrugated sheet are covered.

In order to provide effective and efficient gluing during a "single-facing" process, the fluted cylinders, and sometimes the pressure cylinder, are heated. It is know to heat such cylinders by circulating pressurized, superheated steam within an interior cavity of such a cylinder. Condensation from the heat exchange medium, such as steam, is withdrawn from the cavity.

Also, it is known to apply a vacuum through small holes in the surface of a fluted cylinder in order to retain the corrugated sheet within the flutes as the cover sheet is being pressed to contact therewith by the pressure cylinder. For instance, such devices are disclosed in U.S. Pat. No. 4,381,212, whose disclosure is incorporated by reference thereto, German Patent DE 28 23 674, and U.S. Pat. No. 4,917,664.

U.S. Pat. No. 4,917,664, whose disclosure is incorporated by reference thereto and which claims priority from the application resulting in French patent document 2,622,145, relates to a fluted cylinder having an inner chamber which is permanently linked to a vacuum source and has a series of radial suction apertures which open on a peripheral surface of the cylinder. Furthermore, the cylinder includes a series of axial channels having a permanent circulation of steam which enters and leaves through two coaxial channels arranged on the supporting shaft. Typically, prior art devices have conduits which are fitted in permanent or semi-permanent manner.

Depending on the type of a cardboard product to be produced, a particular corrugation configuration must be provided. Therefore, it is desirable to quickly exchange fluted cylinders in a "single-facing" apparatus for cylinders having a different size or shape corresponding to the desired corrugation. In order to exchange cylinders quickly, it is known to provide a single cassette which houses a pair of fluted cylinders with their bearings and driving motors. Such cassettes are configured to be inserted and received by a frame of a machine which performs other steps such as feeding paper to the cassette, etc. For such a cassette, it is known to provide a cooperative system of rails and rollers between a cassette carriage and the frame so that the cassette can be easily inserted and removed. It is further known to provide a machine which utilizes multiple cassettes. A first cassette can be fitted in an upper space of the machine, having a second cassette positioned below. A mechanism provides for lowering the second cassette in an orthogonal direction.

To change cassettes, it is necessary to disconnect and reconnect the conduits which supply and return steam or vacuum pressure to the side of a cassette adjacent trunnion bearings for the cylinders. Because such connections are traditionally semi-permanent, connecting each conduit involves the insertion of a flange in a bushing and tightening a nut. This can be tedious work, resulting in a slow exchange of cassettes and lost production time.

SUMMARY OF THE INVENTION

The object of the invention consists of a conduit connection device for a cassette containing fluted cylinders used in a "single-faced" corrugated sheet making process, which can be inserted or removed quickly and easily. Another object of the invention is to provide a connection for such a cassette which is reliable, having a close tightness and fit for delivering superheated steam.

To this end, a connector is provided for joining a conduit from a source to a cassette which is insertable in a frame of a machine for forming corrugated paperboard such as single face corrugated paperboard. The connector has a first connector member secured to an end of the conduit. The conduit has another end in communication with the cassette. A second connector member is in communication with the source. A first plate which is fixed relative to the cassette holds the first connector member. A second plate which is fixed relative to the source holds the second connector member. The first connector member and the second connector member are configured to engage each other upon an insertion of the cassette into the frame so that the first conduit is in fluid communication with the source.

In an embodiment, a tubular nose extends from the first connector member, and a duct in the second connector member is configured to receive the nose. Also, the first and second plates are positioned to contact each other when the cassette reaches a point of full insertion into the frame. The first plate is offset from the cassette by a bracket, and a foot holds the second plate at a position away from the frame.

In an embodiment, a tenon or positioning member extends from one of the first or second plates. An orifice in the center of the opposite plate is configured to receive the tenon for aligning the first connector member relative to the second connector member upon an insertion of the cassette into the frame.

In another embodiment, a connector is provided to allow fluid communication between a cassette containing fluted cylinders for corrugating paperboard and a frame configured to receive the cassette. A first plate is secured to the cassette. At least one plug is secured in the first plate. Each plug is also secured to a conduit which is in fluid communication with an interior cavity of one of the cylinders in the cassette. A second plate is secured to the frame. A socket for each plug is secured in the second plate. The first plate and the second plate are arranged so that each socket receives each associated plug in a sealed engagement to provide fluid communication between each socket and each respective conduit when the cassette is inserted into the frame of the machine.

In an embodiment, a tubular nose extends from each plug. The nose has a chamfered front edge. A length of the nose is at least half its outer diameter. An inner duct in said socket is configured to receive and engage a periphery of the nose. A ring shaped seal is set in an annular groove of the inner duct.

An advantage of the present invention is that it provides a quick-change connection of supply and return conduits which carry a heat exchange medium or vacuum pressure to a cassette.

Another advantage of the present invention is that it provides a conduit connection which is tightly sealed.

A further advantage of the present invention is that it provides a conduit connection which is reliable.

Still another advantage of the present invention is that it provides a conduit connection which is simple to use in conjunction with the insertion or removal of a cassette.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

Figure 1:
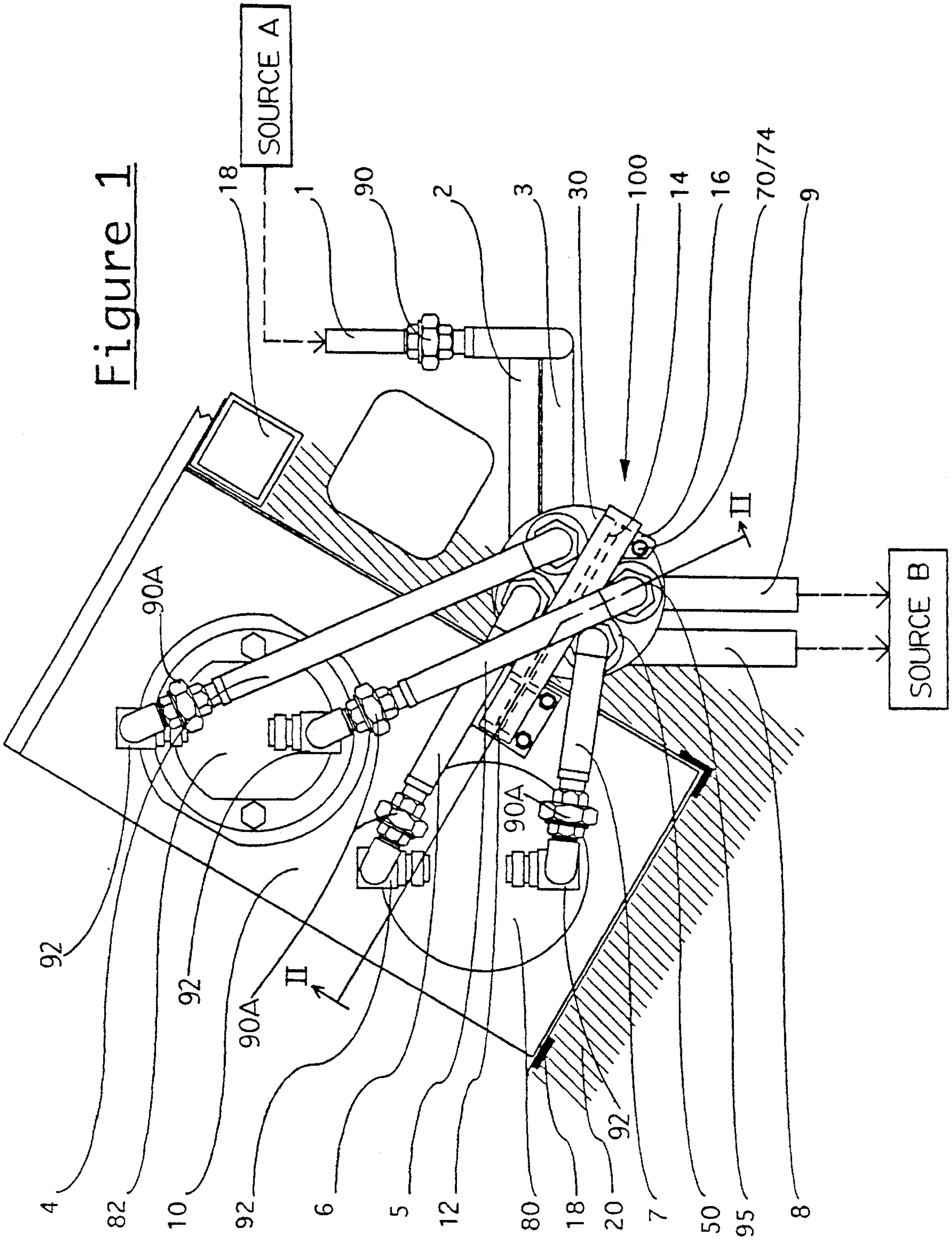
FIG. 1 illustrates a side plan view of the connection according to the present invention as operable mounted between a cassette and a frame.

In accordance with the invention described with reference to the accompanying figures wherein like numerals designate like parts, FIG. 1 illustrates a cassette 10 which contains a lower fluted cylinder 80 and an upper fluted cylinder 82. The cassette 10 is received and guided on rails 18 in a frame 20 of a "single-facing" station of a machine that produces corrugated paperboard. The cylinders inside the cassette engage one another to intermesh their respective flutes with a sheet of paper material in between. Rolling the sheet through the upper and lower cylinders results in the forming of that sheet in a corrugated shape. The upper and lower cylinders are configured to be heated internally by steam up to about 150° C.

The steam is delivered from a source A by a main supply duct 1 under a pressure of approximately sixteen bars. The conduit 1 is connected to a splitting connector 90 from which the superheated steam supply flow is split into main supply conduits 2 and 3. The main supply conduits 2 and 3 are secured to a connector 100. The connector 100 provides a sealed fluid communication from main supply conduit 2 to cassette supply conduit 6, and from main supply conduit 3 to cassette supply conduit 4.

The cassette supply conduit 4 delivers superheated steam to the upper cylinder 82 through a connector 92. Similarly, the cassette supply conduit 6 delivers steam to the lower cylinder 80 through a connector 92. The steam flow from the supply conduits 4 and 6 is thereby directed into an interior cavity (not shown) of each cylinder near the top of a supporting trunnion for heating each respective cylinder.

The steam condenses in the interior cavities as a result of heat transfer. The condensed, cooler steam is withdrawn from the interior cavities near the bottom of the supporting trunnions of the respective cylinders. The cassette return conduit 5 withdraws condensed steam from the upper cylinder 82 through a connector 92. Similarly, the cassette return conduit 7 withdraws condensed steam from the lower cylinder 80 through a connector 92. Furthermore, the conduits 4, 5, 6, 7 can each be provided in multiple sections joined together by connectors 90A.

The cassette return conduits 5 and 7 are each secured to the connector 100 which provides sealed fluid communication from cassette return conduit 5 to a main return conduit 9. Similarly, the connector 100 also provides sealed fluid communication from cassette return conduit 7 to a main return conduit 8. The main return conduits 8 and 9 are in communication with a source B which provides a vacuum pressure or drain to withdraw the condensed steam.

Main supply ducts 2 and 3 and main return conduits 8 and 9 are fixed relative to the frame 20. Cassette supply ducts 4 and 6 and cassette return conduits 5 and 7 are fixed relative to the cassette 10. The connector 100 provides fluid communication between main conduits 2, 3, 8, 9 and cassette conduits 6, 4, 7, 5 respectively.

Figure 2:
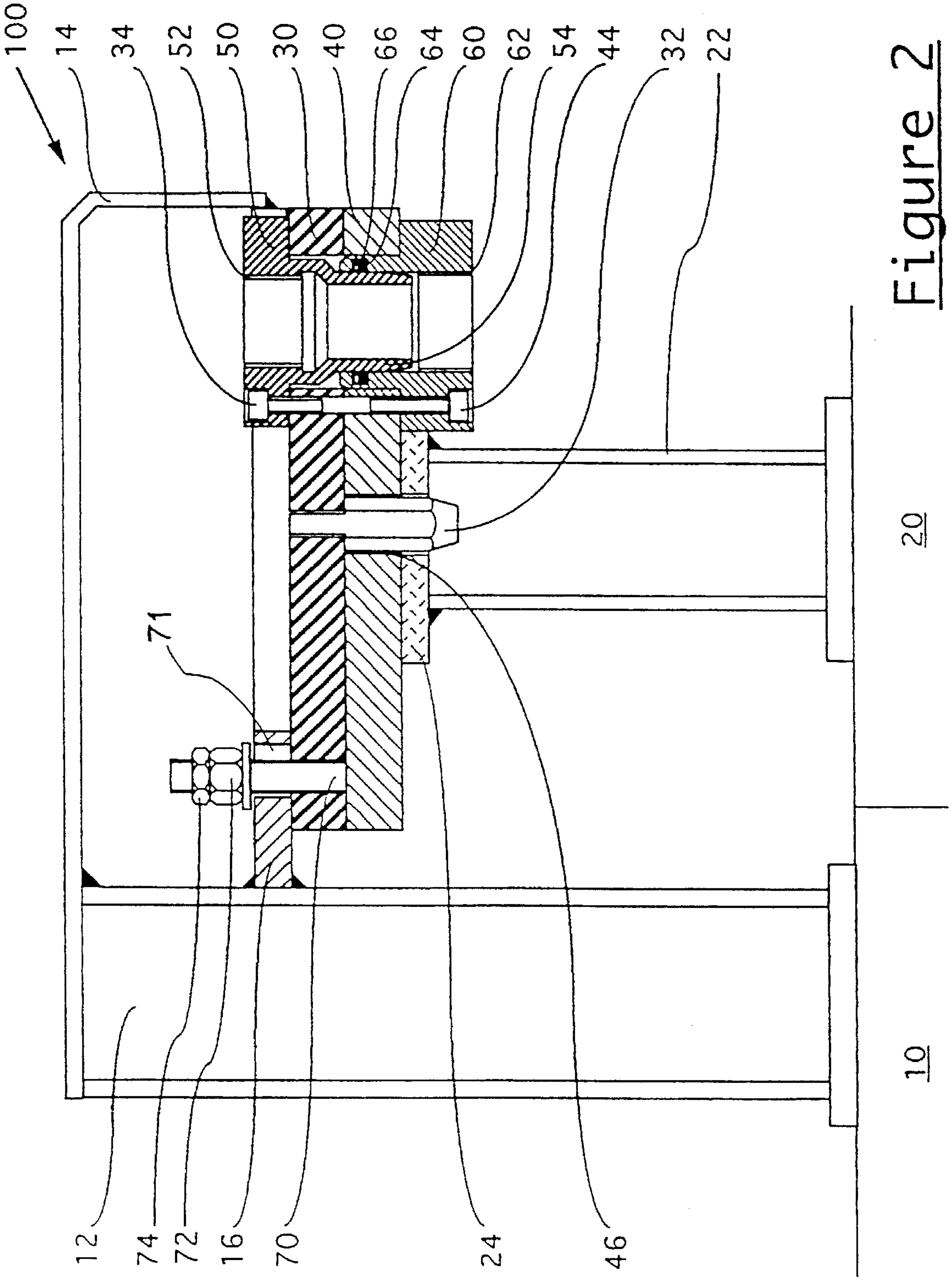
FIG. 2 is a sectional view taken along line II—II of the FIG. 1.

The connector 100 has a first plate 30 which is secured to the cassette 10. Referring to FIG. 2, the connector 100 also has a second plate 40 which is secured to the frame 20. The first plate 30 lies against the second plate 40.

Each conduit is tightened to a respective connecting member such as a plug 50 or a socket 60 (see FIG. 2) by means of a nut 95. The nut 95 provides a semi-permanent connection of each conduit to its respective plug 50 or socket 60 which only requires dismantling for the purpose of repair.

Referring back to FIG. 2, the connection 100 is illustrated in greater detail. A foot 22 is secured to the frame, and extends outwardly therefrom. An intermediate plate 24 is secured at an end of the foot 22. The second plate 40 is secured to the intermediate plate 24. The foot 22 is rigid. The connector 100 is offset so that the cassette 10 can be inserted and removed without interference from the second plate 40.

The first plate 30 is secured to the cassette 10 by a bracket which includes a post 12 and crossbeam 14, however the bracket rigidly holds the first plate 30 at a position offset from the cassette 10. Fixture clips 16 extend from the post 12 and crossbeam 14. Threaded rods 70 extend from the first plate 30 through holes 71 in the fixture clips 16. A nut 72 and a lock-nut 74 are threaded onto each threaded rod 70 to secure the first plate 30 to the fixture clips 16.

The holes 71 are preferably oblong to allow the first plate 30 to shift in a plane parallel thereto approximately ten millimeters relative to the crossbeam 14. This allows a slight amount of "play" during engaging or disengaging the cassette 10 from the frame 20, or for allowing a shifting of the cassette 10 during operation. During such a shift, the first plate 30 can remain secured to the second plate 40, although the post 12 and crossbeam 14 move relative to the cassette 10. Thus, the sealing effect of the connector 100 remains intact during a vertical shift of the cassette 10.

As illustrated in FIG. 2, the post 12, foot 22 and the crossbeam 14 may be tubular, T-shaped, or H-shaped members so long as their dimensions and thickness are such that the post 12, foot 22 and crossbeam 14 are highly rigid.

As illustrated in FIG. 2, the height of the post 12 and the height of the foot 22 are correspondingly sized so that the plates 30 and 40 contact face to face at the point of full insertion of the cassette 10 into the frame 20. Moreover, the height of the foot is such that a curved conduit can be installed at the back of a socket 60.

Each of the cassette-fixed conduits 4, 5, 6, 7, has an end secured to a plug 50. Each plug 50 resides in the first plate where it is retained by a bolt 34. Similarly, each of the frame-fixed conduits 2, 3, 8, 9 is linked at its end to a socket 60. Each socket 60 resides in the second plate 40 where it is retained by a bolt 44.

Each plug 50 is fitted with a threaded bore 52, and each socket 60 is fitted with a threaded bore 62. The threaded bores 52, 62 are configured to receive a tube tightening nut 95 on each conduit 2, 3, 4, 5, 6, 7, 8, 9. Each plug 50 has a tubular nose 54 which extends opposite the threaded bore 52. The nose 54 preferably has a chamfered outer edge.

Correspondingly, each socket 60 has an inner duct configured to receive one of the tubular noses 54. The inner duct is sized to cooperatively receive and sealably engage the respective tubular nose 54. Preferably, the diameter of the inner duct of the socket 60 and the outer diameter of the tubular nose 54 are manufactured within a tolerance of 0.1 millimeter. Moreover, the inner tube of the socket 60 is preferably slightly tapered in shape, increasing in diameter in the direction toward the plug 50. Also, a seal 64 shaped as an O-ring is interposed between the outer surface of the nose 54 and inner surface of the duct. As illustrated, the seal 64 can be held in place by a ring 66 within an annular groove located close to the inlet of the inner duct; however, the groove could be provided in the nose 54. The seal 64 engages the tubular nose 54 to prevent the escape of fluid, such as steam, passing through the connector 100.

In order to ensure a flat engagement between the first plate 30 and the second plates 40 for proper sealing between the plugs 50 and the sockets 60, the first plate 30 and the second plate 40 are precisely aligned by a centering tenon or positioning member 32. The tenon 32 is secured to the first plate 30 at one end and has a frustoconical tip at the other. The tenon 32 tightly resides in a centering orifice 46 machined in the second plate 40.

The tenon 32 provides for very accurate centering of the first and second plates 30 and 40. The aforementioned "play" allows the first plate 30 to shift as the tenon 32 centers into position. In another embodiment which is not shown, centering is achieved by two tenons 32 which reside in two centering orifices 46.

So that the cassette 10 operates only when the connection 100 is secure, an electrical connection or a proximity sensor (not shown) can be provided in the foot 22 adjacent the centering orifice 46, for actuation by the corresponding tenon 32. This insures proper operation by actuating the cassette 10 only upon full insertion of the cassette 10 in the frame 20. The plugs 50, sockets 60, first plate 30 and second plate 40 are aligned in the same direction of travel of the cassette 10 on the rails 18 during insertion and removal so that a proper sealing engagement is achieved between the socket 60 and plugs 50. Furthermore, the centering tenon 32 insures proper positioning during the action of inserting the cassette 10 for proper sealing engagement. Kinetic energy of the travel cassette 10 sufficiently provides that the O-ring seals 64 are fully engaged by the tubular extensions 44.

The cassette 10 locks in its inserted position within the frame 20 to a tolerance of at least 0.1 millimeter. This locking retains the tightness of the connection 100. The connection 100 provides fluid communication between the conduits, the communication being sealed from the atmosphere by the cooperative engagement between the tubular nose 54 and the inner duct of the socket 60, particularly by the ring shaped seals 64.

Various embodiments of the invention could include more or fewer mating plugs and sockets, depending on the conduits needed for a particular cassette. The conduits and connection 100 described could be used for providing only vacuum pressure to either of the cylinders 82 or 80, instead of steam. Only one conduit per cylinder would be needed to provide a vacuum. Such a configuration can be used to hold a sheet within the flutes of one cylinder during a particular process. Also, the plates 30 and 40 could have another shape such as the shape of a regular polygon. Furthermore, the first plate 30 and second plate 40 could be positioned at another side of the cassette, other than that shown in FIGS. 1 and 2.

In an alternative embodiment (not shown), the sockets 60 are mounted in the first plate 30, and the plugs 50 are mounted in the second plate 40. The plugs 50 and sockets 60 can be any cooperative shapes, which sealably engage each other.

It should be understood that various changes and modifications to the presently preferred embodiments described herein will be apparent to those skilled in the art. Such changes and modifications may be made without departing from the spirit and scope of the present invention and without dimensioning its attendant advantages. It is, therefore, intended that such changes and modifications be covered by the appended claims.

What is claimed is:

1. A connector for joining a conduit from a source to a cassette which is insertable in a frame, the connector comprising:

a first connector member secured to an end of said conduit, said conduit having another end in communication with said cassette;

a second connector member being in communication with said source;

a first plate which is fixed relative to said cassette and which holds said first connector member; and a second plate which is fixed relative to said source and which holds said second connector member;

wherein said first connector member and said second connector member are configured to engage each other upon an insertion of said cassette into said frame so that said first conduit is in fluid communication with said source, and wherein said first and second plates are positioned to contact each other when said cassette reaches a point of full insertion.

2. A connector according to claim 1 further comprising:

a tubular nose extending from said first connector member; and a duct in said second connector member configured to receive said nose.

3. A connector according to claim 1 wherein said first plate is offset from said cassette by a bracket.

4. A connector according to claim 1 further comprising:

a tenon extending from said first plate; and an orifice in said second plate configured to receive said tenon for aligning said first connector member relative to said second connector member upon an insertion of said cassette.

5. A connector according to claim 1 further comprising:

a foot which holds said second plate at a position away from said frame.

6. A connector according to claim 1 wherein said source delivers a flow of steam through said conduit.

7. A corrugator apparatus comprising:

a cassette containing fluted cylinders for corrugating paperboard;

a frame configured to slidably receive said cassette; and a connector for providing fluid communication between said cassette and said frame; the connector including:

a first plate secured to said cassette;

at least one plug secured in said first plate, each said plug also being secured to a first conduit which is in fluid communication with an interior cavity of one of said cylinders in said cassette;

a second plate secured to said frame; and at least one socket associated with each said plug, each said socket being secured in said second plate and in fluid communication with a second conduit from said frame;

wherein said first plate and said second plate are arranged so that each said socket receives each associated said plug in a sealed engagement to provide fluid communication between each said second conduit and each respective said first conduit when the cassette is inserted into the frame, and so that said first and second plates contact each other when said cassette reaches a point of full insertion.

8. An apparatus according to claim 7 further comprising:

a tubular nose extending from said plug, said nose having a chamfered front edge, a length of the nose being at least half its outer diameter; and an inner duct in said socket configured to receive and engage a periphery of said nose.

9. An apparatus according to claim 8 further comprising:

a ring shaped seal set in an annular groove of said inner duct.

10. An apparatus according to claim 7 further comprising:

a bracket which supports said first plate offset from a side of said cassette.

11. An apparatus according to claim 7 further comprising:

a foot extending from said frame for supporting said second plate.

12. An apparatus according to claim 7 further comprising:

a centering tenon extending from said first plate, said tenon having a tapered tip, a length of said tenon being greater than said nose; and a centering orifice disposed in said second plate for engaging said tenon.

13. In a cassette having a rotatable cylinder used for producing corrugated paperboard and a connector for joining a first set of conduits to a second set of conduits to provide fluid communication between a source and a cylinder of the cassette, the said cassette being insertable in a frame, the improvement comprising the connector having:

a plurality of first connector members, each first connector member being secured to an end of a first conduit of a first set of conduits, each first conduit having another end in communication with an interior of the cylinder of said cassette;

a plurality of second connector members, each second connector member being secured to an end of a second conduit from a second set of conduits, each second conduit having another end in communication with the source;

a first plate which is fixed relative to said cassette and which holds said first connector members; and a second plate which is fixed on said frame and which holds said second connector members;

wherein each first connector member is associated with one of the second connector members, said associated first and second connector members being configured to sealably engage each other upon an insertion of said cassette into said frame so that said each said first conduit is in fluid communication with an associated said second conduit as the cassette is inserted into the frame.

14. A connector according to claim 13 further comprising:

a tubular nose extending from said first connector member; and a duct in said second connector member configured to receive said nose such that said a periphery of said nose engages said duct.

15. A connector according to claim 13 wherein said first and second plates are positioned to contact each other when said cassette is fully inserted into said frame.

16. A connector according to claim 13 wherein said first plate is offset from said cassette by a bracket.

17. A connector according to claim 13 further comprising:

a tenon extending from said first plate; and an orifice in said second plate configured to receive said tenon for aligning said first connector members relative to said associated second connector members upon an insertion of said cassette.

18. A connector according to claim 13 further comprising:

a foot which holds said second plate at a position away from said frame.

19. A connector according to claim 13 wherein there are four first connector members and four second connector members, and wherein two said first conduits supply steam to said cassette and two said first conduits withdraw condensed steam from said cassette.

20. A corrugator apparatus comprising:

a frame;

a cassette containing fluted cylinders for corrugating paperboard, said cassette being insertable into said frame; and a connector operable to join a conduit from a source to the cassette, the connector comprising:

a first connector member secured to an end of said conduit, said conduit having another end in communication with said cassette;

a second connector member being in communication with said source;

a first plate which is fixed relative to said cassette and which holds said first connector member; and a second plate which is fixed relative to said source and which holds said second connector member;

wherein said first connector member and said second connector member are configured to engage each other upon an insertion of said cassette into said frame so that said first conduit is in fluid communication with said source and wherein said first and second plates are positioned to contact each other when said cassette reaches a point of full insertion.

21. A connector according to claim 10 further comprising:

a tubular nose extending from said first connector member; and a duct in said second connector member configured to receive said nose.

22. A connector according to claim 10 wherein said first plate is offset from said cassette by a bracket.

23. A connector according to claim 20 further comprising:

a tenon extending from said first plate; and an orifice in said second plate configured to receive said tenon for aligning said first connector member relative to said second connector member upon an insertion of said cassette.

24. A connector according to claim 20 further comprising:

a foot which holds said second plate at a position away from said frame.

25. A connector according to claim 20 wherein said source delivers a flow of steam through said conduit to flow through said fluted cylinders.

* * * * *